(12) United States Patent
Winkler

(10) Patent No.: US 11,858,749 B2
(45) Date of Patent: Jan. 2, 2024

(54) MODULAR SYSTEM FOR PRODUCING A CONVEYING DEVICE COMPRISING A PLURALITY OF CONVEYING ZONES

(71) Applicant: Dematic GmbH, Heusenstamm (DE)

(72) Inventor: Max Winkler, Graz (AT)

(73) Assignee: Dematic GmbH, Heusenstamm (DE)

( * ) Notice: Subject to any disclaimer, the term of this patent is extended or adjusted under 35 U.S.C. 154(b) by 183 days.

(21) Appl. No.: 17/281,468

(22) PCT Filed: Sep. 27, 2019

(86) PCT No.: PCT/EP2019/076217
§ 371 (c)(1),
(2) Date: Mar. 30, 2021

(87) PCT Pub. No.: WO2020/070006
PCT Pub. Date: Apr. 9, 2020

(65) Prior Publication Data
US 2022/0002091 A1    Jan. 6, 2022

(30) Foreign Application Priority Data

Oct. 5, 2018   (DE) .......................... 102018124599.8

(51) Int. Cl.
*B65G 37/00*    (2006.01)
*B65G 43/10*    (2006.01)
(Continued)

(52) U.S. Cl.
CPC .............. *B65G 7/00* (2013.01); *B65G 13/04* (2013.01); *B65G 13/11* (2013.01); *B65G 15/22* (2013.01);
(Continued)

(58) Field of Classification Search
CPC ........ B65G 37/00; B65G 13/04; B65G 13/11; B65G 15/22; B65G 21/10; B65G 43/10; B65G 2207/30
See application file for complete search history.

(56) References Cited

U.S. PATENT DOCUMENTS 4,046,248 A * 9/1977 Goffredo ................... C23F 1/08
198/860.3
4,534,462 A * 8/1985 Hoover ................ B65G 47/261
198/781.06
(Continued)

FOREIGN PATENT DOCUMENTS

CN    203699247 U    7/2014
CN    207450965 U    6/2018
(Continued)

OTHER PUBLICATIONS

Preliminary Report on Patentability of the International Searching Authority in English from corresponding Patent Cooperation Treaty (PCT) Application No. PCT/EP2019/076217, completed Mar. 23, 2021.

(Continued)

*Primary Examiner* — Mark A Deuble
(74) *Attorney, Agent, or Firm* — Gardner, Linn, Burkhart & Ondersma LLP

(57) ABSTRACT

A conveying device includes a plurality of conveying zones having conveying elements, each conveying zone having at least one conveying drive for the conveying elements of the zone in question and being associated with a control unit that controls the conveying drive of the conveying zone, with the conveying device being designed having a support structure. Each conveying zone is formed by an individual independent conveying module that is fastened on the support structure as a complete individual unit and forms the entirety (Continued)

of the conveying device with additional adjacent conveying modules.

18 Claims, 3 Drawing Sheets

(51) Int. Cl.
*B65G 13/04* (2006.01)
*B65G 13/11* (2006.01)
*B65G 15/22* (2006.01)
*B65G 21/10* (2006.01)
*B65G 7/00* (2006.01)

(52) U.S. Cl.
CPC ............ *B65G 21/10* (2013.01); *B65G 43/10* (2013.01); *B65G 2207/30* (2013.01)

(56) References Cited

U.S. PATENT DOCUMENTS

| | | | |
|---|---|---|---|
| 6,302,266 B1 | 10/2001 | Defrancisco | |
| 6,729,463 B2 * | 5/2004 | Pfeiffer | B65G 43/08 198/781.05 |
| 6,796,418 B1 * | 9/2004 | Harrison | B65G 21/06 198/861.1 |
| 6,959,804 B2 * | 11/2005 | Helgerson | B65G 13/11 198/781.01 |
| 9,257,672 B2 * | 2/2016 | Yoon | H10K 59/12 |
| 9,409,709 B2 * | 8/2016 | Keating | B65G 1/0492 |
| 9,944,496 B2 * | 4/2018 | Matheisl | B66B 23/14 |
| 10,230,315 B2 * | 3/2019 | Ramezani | B65G 21/14 |
| 10,669,102 B2 * | 6/2020 | McIntire | B65G 21/06 |
| 10,717,609 B2 * | 7/2020 | Jung-Sassmannshausen | B65G 21/10 |
| 11,401,111 B2 * | 8/2022 | Seok | B65G 43/10 |
| 2007/0187211 A1 * | 8/2007 | Vertogen | B65G 15/50 198/461.1 |
| 2008/0073185 A1 * | 3/2008 | Brayman | B65G 15/00 198/860.2 |
| 2009/0255784 A1 | 10/2009 | Kuhn et al. | |
| 2010/0219050 A1 | 9/2010 | Deyanov | |
| 2016/0340125 A1 | 11/2016 | Möller | |

FOREIGN PATENT DOCUMENTS

| | | |
|---|---|---|
| DE | 102005042318 A1 | 11/2006 |
| DE | 60131404 T2 | 9/2008 |
| DE | 202008009151 U1 | 2/2009 |
| EP | 3357841 A1 | 8/2018 |
| WO | 2011032196 A1 | 3/2011 |
| WO | 2012113922 A1 | 8/2012 |
| WO | 2013000005 A1 | 1/2013 |
| WO | 2015051390 A1 | 4/2015 |

OTHER PUBLICATIONS

International Search Report of the International Searching Authority from corresponding Patent Cooperation Treaty (PCT) Application No. PCT/EP2019/076217 and English translation, indicated completed on Jan. 10, 2020.
International Written Opinion of the International Searching Authority from corresponding Patent Cooperation Treaty (PCT) Application No. PCT/EP2019/076217, indicated completed on Jan. 10, 2020.

* cited by examiner

MODULAR SYSTEM FOR PRODUCING A CONVEYING DEVICE COMPRISING A PLURALITY OF CONVEYING ZONES

CROSS REFERENCE TO RELATED APPLICATION

The present application claims the priority benefits of International Patent Application No. PCT/EP2019/076217, filed Sep. 27, 2019, and claims benefit of German patent application no. DE 10 2018 124 599.8, filed on Oct. 5, 2018.

BACKGROUND AND FIELD OF THE INVENTION

The invention relates to a modular system for producing a conveying device, wherein the conveying device comprises a conveyor, which comprises a plurality of conveying zones with conveying means, of which each conveying zone comprises at least one conveying drive for the conveying means of the respective zone and is allocated to a control unit which actuates this conveying drive of the conveying zone, wherein the conveying device is designed with a support structure on which the conveyor is attached and elevated, according to the claims, and to a corresponding assembly method.

Conventional conveying systems, in particular roller conveyors, have a structure in which motorized and passive conveying rollers are disposed between two opposing side walls. The side walls thus serve as a holder for the conveying rollers and also as a support for the controller and electrical system used for controlling and supplying power to the conveying rollers and possibly also for corresponding sensors. The side walls are usually designed with a regular pattern of holes so that the conveying rollers can be attached thereby in a regularly spaced manner. If the conveyor is a belt conveyor, then, in one variation, the rollers can also have a (possibly tensionable) conveyor belt looped around them. In another variation, the belt or the conveyor belt is supported by plates or surfaces made of other materials.

Thus WO 2011/032196 A1 discloses a roller conveyor for conveying items to be conveyed, having an electrical power supply system and a plurality of conveying rollers, wherein at least one of the conveying rollers comprises a roller body and a drive motor which is disposed inside this body, is connected to the power supply system in order to be supplied with electric power and serves as a generator during braking of an item being conveyed. The conveying rollers are held between frame profiles which are in turn held together by transverse bars.

WO 2012/113922 A1 describes a method for setting up a conveying apparatus (and a corresponding conveying device), comprising a plurality of conveying zones, each of which comprises at least one conveying drive and is allocated to a control unit which actuates this conveying drive.

US 2008/0073185 A1 discloses a belt conveyor module which can be mounted between side walls and can be driven by a drive mounted on the side walls.

WO 2013/000005 A1 discloses a conveying installation with a frame and a plurality of motor-driven conveying means disposed there between, wherein a cable arrangement attached to the frame and electrically connected to the conveying means is provided, which comprises a first electrical conductor and at least a second electrical conductor which are isolated with respect to each other, a plurality of plug devices disposed along the conductors and each having a plurality of electrical contacts, wherein, in each case, at least one contact is connected to an electrical conductor, and the first conductor is split at each plug device and in each case an end of the first conductor is connected to a respective electrical contact.

WO 2015/051390 A1 likewise discloses a conveyor comprising two frame profiles extending mutually spaced apart, a plurality of motorized conveying rollers disposed there between, an insulator extending along the at least one frame profile and having a plurality of receivers, which are open on the long side, and a plurality of power conductors disposed in the insulator, which are electrically connected to drive electronics of the conveying rollers, wherein a respective power conductor is mounted in each receiver.

SUMMARY OF THE INVENTION

The present invention provides an option which permits simple and convenient production of a conveyor, rapid assembly and conversion and changes to functions.

In accordance with an aspect of the invention it has been recognized that if, for each conveying zone, the modular system contains a single independent conveying module which is fixed to the support structure as a complete individual unit and, along with further adjacent conveying modules of the modular system, forms the entirety of the conveyor, it is possible to assemble the one conveyor in the factory, preferably completely, i.e. entirely inclusive of cabling, integrated transfer elements etc.

The complete individual unit is thus a pre-assembled, wired and usable modular unit which then merely has to be placed onto the support structure in order to produce the overall desired conveyor in conjunction with further corresponding individual units or conveying modules. Should there be any case of doubt, on site it is merely necessary to connect each module in terms of electric power and control technology by simply plugging it in, e.g. through daisy-chaining, etc.

The principle of the modular system thus includes the idea of the unitary support structure, to which, as desired, the widest range of necessary, complete, small, standardized conveying modules, with or without further functionality, are attached as required in order to function as components which together form the whole conveyor.

In other words, an aspect of the invention is based on the idea of constructing the complete conveyor in its greater overall length from smaller, highly standardized conveying modules in a Lego-like manner from a modular system, i.e. from highly modular, uniform elements which, when used in numbers, produce the whole structure of the conveyor. The modules each comprise typically 3 rollers in addition to a drive, sensors and controller.

Thus more rapid and simple production of the conveyor can be achieved by the higher level of modularization. This latter feature also applies in particular to an extremely wide range of elements of a conveyor, i.e. transfer elements, stoppers etc. in addition to the (drive) rollers.

In the present case, mechanical conveying systems in warehouses are considered to be conveyors, these systems transporting articles, with or without auxiliary loading means, in the warehouse, for which purpose they usually comprise rollers, belts or bands as a straight or curved conveying surface. In addition, the conveyor can have a functionality: turning, channeling in or out, accumulating, conveying around a curve, conveying on an incline or weighing, measuring or orientating.

In addition, this modularity can also be used for conversions, subsequent changes of functionality of an already constructed conveyor installed in the plant, in a previously impossible short conversion time and which is therefore also less expensive. In relation to this, the complete assembly of the conveyor at the construction site without much outlay is also possible since all elements are so highly modularized and pre-produced.

Conveying modules can thus also be pre-manufactured in a standardized manner, i.e. as units which are always of the same construction, provided in large numbers in order to produce the entire conveying device on the customer's premises just by placing the conveying modules on the provided support structure. The support structure, also often referred to as the stand, serves to support the modules and to stand them on the floor of the site where they are to be used.

The standardization of the conveying modules also permits a mass effect to the achieved which allows simplified assembly of the whole system at the customer's premises. The individual conveying means (e.g. rollers) of the modules do not have to undergo complex installation between side walls over considerable lengths, but rather the required number of conveying modules are simply fixed next to each other on the support structure and connected in terms of electric power and control technology by plugging the cabling together.

The conveying device which can be produced using the modular system thus has an overall length X and each conveying module of the modular system has a standardized consistent partial length of the overall length X. Conveying modules of different length are provided so that different final lengths or overall lengths of the conveyor as a whole can be produced. Therefore, the desired length can be built up by combining shorter and longer conveying modules.

It is preferred if each conveying module has a length corresponding to two to five conveying rollers, in particular a length corresponding to three conveying rollers. It has proved to be the case that, with such a standardized length, each conveying module can, on the one hand, support and convey loads in a stable manner (e.g. without tipping etc.) and on the other hand, with a plurality of such modules, it is possible to have conveying device installations which can be varied to different lengths if necessary.

Each conveying module of the modular system is designed as a pre-manufactured unit together with conveying means, conveying drive, control unit, electrical system, cabling and possibly sensors. No driving connection to drive motors on the side walls is now required.

Each conveying module also comprises a frame to receive the conveying means, conveying drives, electrical system, cabling and possibly sensors, which is fixed on the support structure. Fixing is preferably carried out on the upper side of the support structure by means of snap-in connections between the frame and support structure. The frame thus supports the conveying means and the drives thereof and houses the electrical cabling and control cabling of the module. In addition, sensors can also be provided or provision can be made for attachment of same. Modular interfaces for the incorporation of the module into the assembly as a whole are also provided, e.g. as plug connections, etc.

In addition, each conveying module can comprise snap-in receivers for clipping-in attachments such as control modules/boards, cable guides, guard rails/side guides and covers or sensor modules.

An aspect of the invention consists of generating as little assembly outlay as possible and using pre-produced components which are standardized with respect to construction, function, length, etc. Therefore, the conveying device can be fitted together almost in a Lego-like manner.

It is thus preferred if the conveying means, conveying drives, electrical system, cabling and sensors are also designed in a modular manner or are contained as modules in the modular system. In other words, each modular individual unit or each conveying module of the modular system itself consists in turn of modular components. Thus, a base frame of a standardized length can be provided, to which all other parts are attached in a modular manner in order to pre-assemble the respective conveying module as much as possible in the factory.

The control unit of each conveying module can accordingly be connected in terms of control technology to the control units of adjacent conveying modules, for which purpose these are coupled in series by bus technology e.g. in the manner of daisy chain cabling. It will be understood that the conveying modules can also provide parallel or other cabling as required.

As conveying modules, the modular system thus preferably comprises roller conveying modules, belt conveying modules, band conveying modules, turning modules, modules for channeling items in or out, modules for conveying items around a curve, modules for conveying items on an incline or even functional conveying modules for weighing, measuring or orientating.

The support structure of the conveying device is designed in accordance with the invention as a unit which is independent of the conveying modules and on which simplified requirements are placed, since it must support only the conveying modules. Thus, it does not also have to enable, as with previously conventional side walls, complex mounting of components in a regularly spaced manner by means of corresponding bores, apertures, chamfers etc., since these are integrated as much as possible into the individual conveying modules.

The conveying modules and the support structure are preferably designed in such a way that each conveying module can be fixed, preferably clipped, on a flat upper support rail of the support structure on which it has been placed.

It has thus been recognized that, by virtue of the principle of placeable modules and a simple support rail, the side walls no longer constitute an obstacle to be overcome by the items being conveyed, which is advantageous e.g. precisely when items are being channeled in or out. Assembly and maintenance and also possibly conversion thereof or exchange of the modules are also simpler because they are more accessible.

In other words, the support structure is preferably a simple stand with a flat upper attachment rail on which the individual conveying modules are placed. These can thus be snapped into corresponding receiving recesses by means of snap-in holding devices. Mounting is thus limited to placement and fixing, wherein fixing can be carried out at the same time, by snapping-in etc., or subsequently by screwing. The support rail can comprise guide projections disposed in a regularly spaced manner in the longitudinal direction in order to facilitate placement.

The invention also relates in a corresponding manner to a corresponding assembly method.

Further details of the invention will become clear from the following description of exemplified embodiments by reference to the drawings.

DESCRIPTION OF THE PREFERRED EMBODIMENTS

Figure 1:
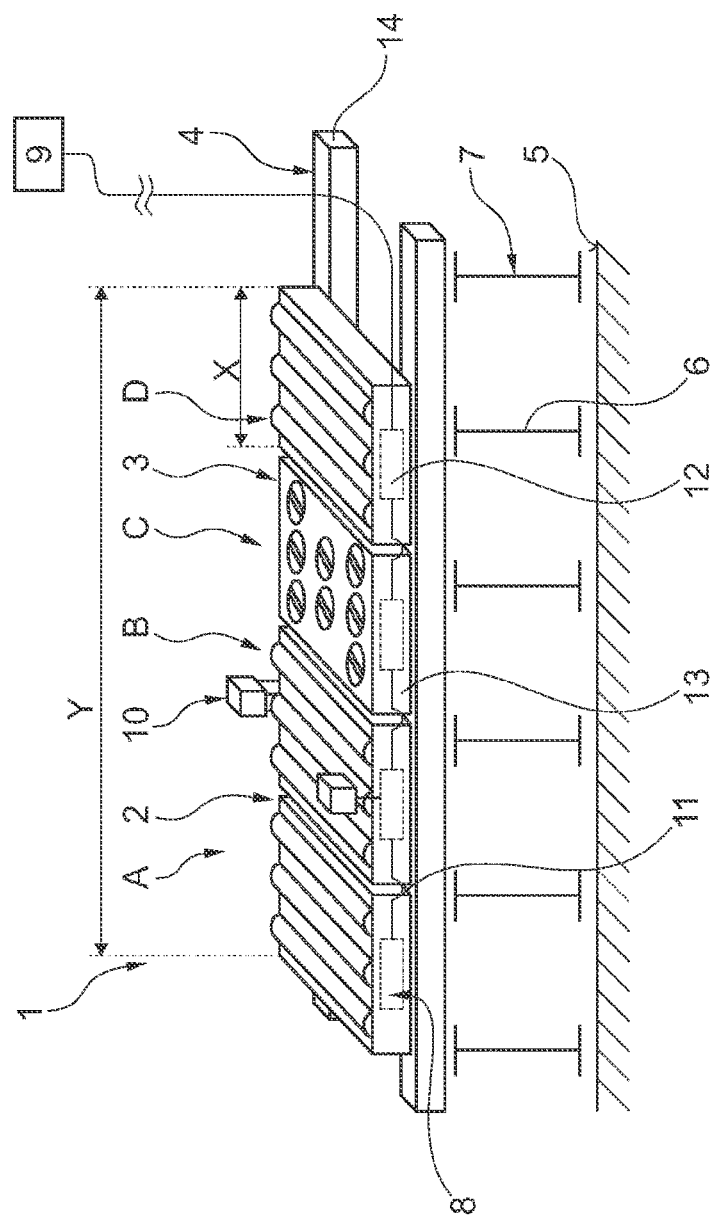
FIG. 1 is a schematic perspective view of a conveyor of modular construction.

The figures show a conveyor designated as a whole by 1, which has been fitted together from a modular system. The conveyor 1 has a plurality of successive conveying zones A, B, C, D. Each conveying zone A, B, C, D is designed as an individual independent conveying module 2, 3. In the present case, these modules are driven roller conveying modules 2 or transfer conveying modules 3. Each module 2, 3 is fixed as a complete individual unit on a support structure 4 and connected to further adjacent conveying modules of the modular system in order to form the entirety of the conveyor 1. Thus each conveying module 2, 3 of the modular system comprises a standardized consistent partial length X of the overall length Y of the conveyor 1. In the present case, the length X of a conveying module 3 corresponds to a length which corresponds to three (conventionally spaced) conveying rollers.

Figure 3:
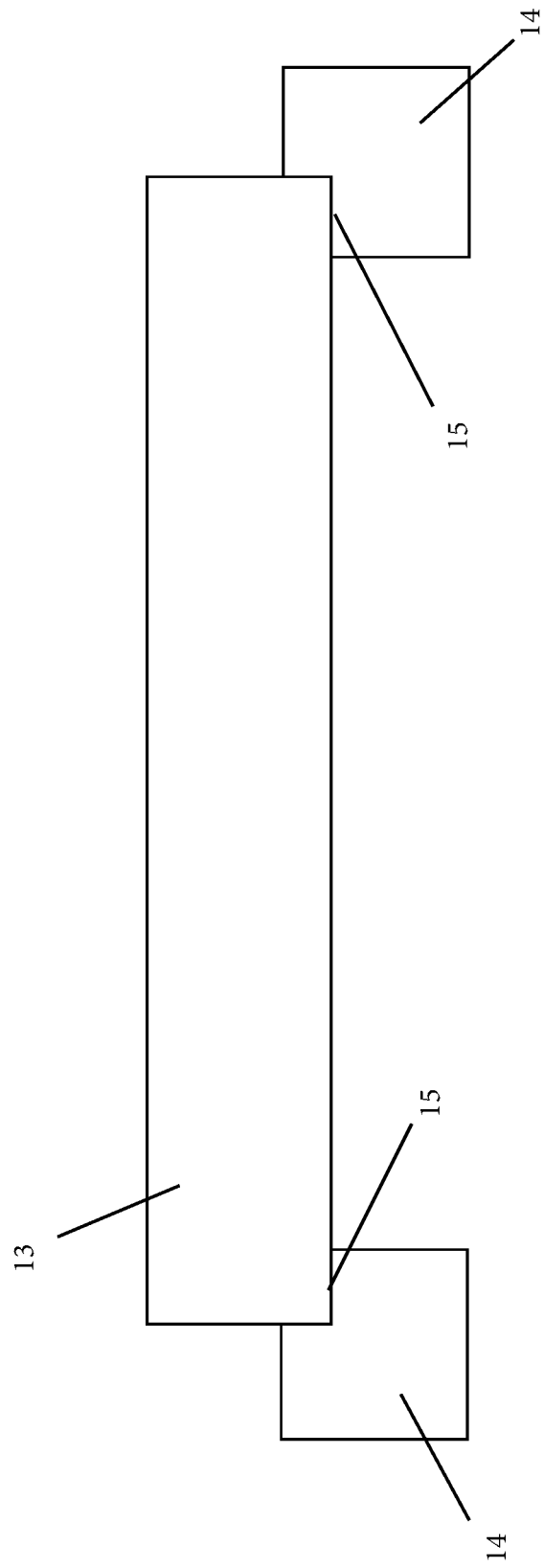
FIG. 3 is a side sectional view of a conveying module fixed to support rails.

The support structure 4 of the conveyor 1 is designed as a unit which is independent of the conveying modules of the modular system and comprises a flat upper support rail 14 which is placed on the stand 7 formed of spaced-apart uprights 6. The uprights 6 or the stand 7 raise the construction from the floor 5. The conveying modules 2, 3 of the modular system are in turn fixed by snapping-in on the support rail 14, for which purpose this comprises recesses 15 corresponding to the regular spacing on the upper side of the support rail 14 (FIG. 3).

The individual conveying modules 2, 3 comprise integrated cabling 8 which is connected via plug connections 11 to adjacent conveying modules during mounting on the support rail 14. The cabling 8 is in turn connected in bus form to a controller 9 which controls the drives 12 and sensors 10 (e.g. photo sensors) which may be present, or communicates with the sensors. The cabling 8 and the drives 12 are integrated within the modules 2, 3, i.e. within the support frame 13 thereof. The plug connections 11 are also integrated into the frame 13. The sensors 10 can be placed, also in a snap-in manner, on the frame 13 of the respective conveying modules 2, 3.

Therefore, each conveying module 2, 3 of the modular system is designed as a pre-manufactured unit together with conveying means, conveying drive, control unit, electrical system and cabling.

Figure 2:
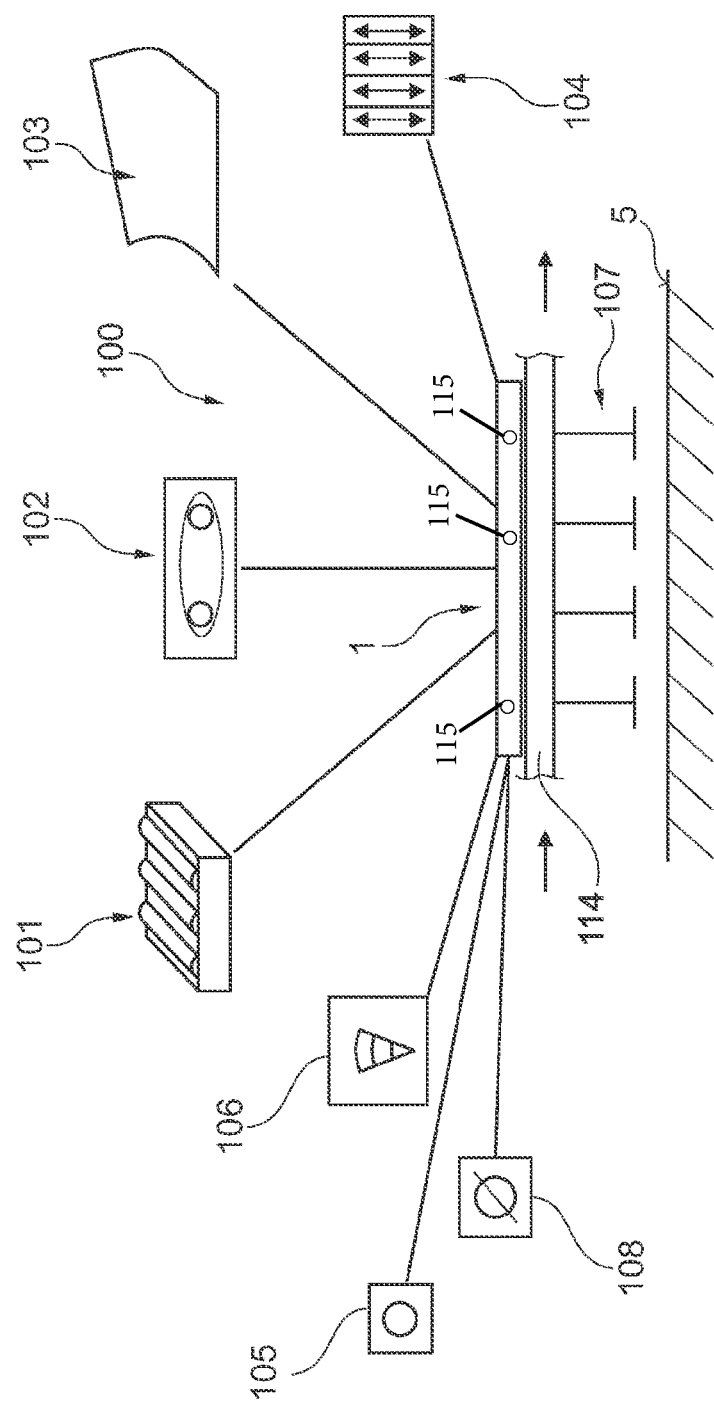
FIG. 2 shows the construction of the modular system for the production of the modular conveyor of FIG. 1.

FIG. 2 also depicts the modular system 100, with which conveyors 1 corresponding to FIG. 1 (and further conveyors) can be produced in a modular manner of construction.

As mentioned above, the modular system 100 comprises a modular stand 107 on which a support rail 114 is placed. Any elements of the modular system can then be disposed on the support rail 114. These are, in particular, conveying modules which can be a roller conveying module 101, a belt conveying module 102, a transfer module 104 as a module for channeling items in or out, or a module 103 for conveying items around a curve. Naturally, further embodiments of the modules as a band conveying module, accumulating module, module for conveying items on an incline or a functional conveying module for weighing, measuring or orientating items are also feasible.

Each conveying module of the modular system comprises a frame for receiving the conveying means, conveying drives 105, electrical system 108, cabling and possibly sensors 106, wherein by means of the frame it is fixed on the support structure by means of snap-in connections, as explained in reference to FIG. 1. Each conveying module of the modular system further comprises snap-in receivers 115 for clipping-in modular attachments such as control modules/boards, cable guides, guard rails or side guides and covers or sensor modules.

The conveying means, conveying drives, electrical system, cabling and sensors of the conveying modules of the modular system are also designed in a modular manner.

The invention claimed is:

1. A modular system for producing a conveying device, wherein the conveying device comprises a conveyor that comprises a plurality of conveying zones with conveying surfaces, of which each conveying zone comprises at least one conveying drive for the conveying surface of the respective zone and is allocated to a control unit that actuates the associated conveying drive of the conveying zone, wherein the conveying device is designed with a support structure on which the conveyor is attached and elevated, wherein for each conveying zone the modular system contains a single independent conveying module that is fixed to the support structure as a complete individual unit and, along with further adjacent conveying modules of the modular system, forms the entirety of the conveyor, and wherein each conveying module of the modular system is designed as a pre-manufactured unit together with the associated conveying surface, conveying drive, and control unit, and with an electrical system, a cabling and optionally sensors, wherein each conveying module of the modular system comprises a frame to receive the conveying surface, conveying drives, electrical system, cabling and optional sensors, and wherein by means of the associated frame each conveying module is fixed on the support structure, wherein an upper side of the support structure includes a plurality of snap-in recesses and wherein each conveying module of the modular system is configured to be fixed on the upper side of the support structure by snap-in connections between the frame and the snap-in recesses of the support structure.

2. The modular system as claimed in claim 1, wherein the conveying device which can be produced using the modular system has an overall length X and each conveying module of the modular system has a standardized partial length of the overall length X.

3. The modular system as claimed in claim 2, wherein each conveying module has a consistent partial length of the overall length X, and wherein the snap-in recesses on the support structure are spaced apart at regular distances.

4. The modular system as claimed in claim 2, wherein each conveying module of the modular system comprises snap-in receivers for clipping-in modular attachments such as control modules/boards, cable guides, guard rails or side guides and covers or sensor modules.

5. The modular system as claimed in claim 1, wherein the conveying surfaces, conveying drives, electrical system, cabling and sensors of the conveying modules are also designed in a modular manner.

6. The modular system as claimed in claim 1, wherein the control unit of each conveying module of the modular system is connected in terms of control technology to the control units of adjacent conveying modules of the modular system.

7. The modular system as claimed in claim 1, wherein the conveying surfaces comprise conveying rollers and wherein each conveying module of the modular system has a length corresponding to two to five conveying rollers.

8. The modular system as claimed in claim 7, wherein each conveying module of the modular system has a length corresponding to three conveying rollers.

9. The modular system as claimed in claim 7, wherein the control unit of each conveying module of the modular system is connected in terms of control technology to the control units of adjacent conveying modules of the modular system.

10. The modular system as claimed in claim 1, wherein the conveying modules are selected from the group consisting of a roller conveying module, a belt conveying module, a band conveying module, a turning module, a module for channeling items in or out, a module for conveying items around a curve, an accumulating module, a module for conveying items on an incline or a functional conveying module for weighing, measuring or orientating.

11. The modular system as claimed in claim 1, wherein the support structure of the conveying device is designed as a unit that is independent of the conveying modules of the modular system.

12. The modular system as claimed in claim 1, wherein the conveying modules of the modular system and the support structure are designed such that each conveying module of the modular system can be fixed on a flat upper support rail of the support structure on which it has been placed.

13. The modular system as claimed in claim 12, wherein each conveying module of the modular system can be clipped on the flat upper support rail of the support structure on which it has been placed.

14. The modular system as claimed in claim 1, wherein each conveying module of the modular system comprises snap-in receivers for clipping-in modular attachments such as control modules/boards, cable guides, guard rails or side guides and covers or sensor modules.

15. An assembly method for a conveying device using a modular system, wherein the conveying device comprises a conveyor that comprises a plurality of conveying zones with conveying surfaces, of which each conveying zone comprises at least one conveying drive for the conveying surface of the respective zone and is allocated to a control unit that actuates the associated conveying drive of the conveying zone, wherein the conveying device is designed with a support structure, said method comprising:

attaching the conveyor to the support structure so as to be elevated, wherein each conveying zone is formed from a single independent conveying module of the modular system, which is fixed to the support structure as a complete individual unit and, along with further adjacent conveying modules, forms the entirety of the conveyor, and wherein each conveying module is designed as a pre-manufactured unit together with the associated conveying surface, conveying drive, and control unit, and with an electrical system, a cabling and optionally sensors, wherein each conveying module of the modular system comprises a frame to receive the conveying surface, conveying drives, electrical system, cabling and optional sensors, and wherein each conveying module is attached to the support structure by the frame being snap-in connected to snap-in recesses disposed at an upper side of the support structure.

16. The assembly method as claimed in claim 15, wherein the conveying modules are selected from the group consisting of a roller conveying module, a belt conveying module, a band conveying module, a turning module, a module for channeling items in or out, a module for conveying items around a curve, an accumulating module, a module for conveying items on an incline or a functional conveying module for weighing, measuring or orientating.

17. The assembly method as claimed in claim 15, wherein the support structure comprises a pair of spaced apart support rails that include the snap-in recesses configured to receive each conveying module.

18. The modular system as claimed in claim 1, wherein the support structure comprises a pair of spaced apart support rails that each include snap-in recesses for receiving each conveying module.

\* \* \* \* \*